United States Patent [19]

Gerzeny et al.

[11] Patent Number: 4,981,319
[45] Date of Patent: Jan. 1, 1991

[54] HYDRAULIC LIFT CAMPER TOP

[76] Inventors: Ruben Gerzeny; David Gerzeny; Steven Gerzeny, all of 208D Warfield, Venice, Fla. 33595

[21] Appl. No.: 380,513

[22] Filed: Jul. 17, 1989

[51] Int. Cl.$^5$ .......................... B60J 7/08; B60J 7/185; B60P 3/34

[52] U.S. Cl. .................................... 296/26; 296/99.1; 296/165; 296/176

[58] Field of Search ............... 296/160, 164, 165, 173, 296/175, 176, 26, 27, 99.1

[56] References Cited

U.S. PATENT DOCUMENTS

| | | | |
|---|---|---|---|
| 2,710,977 | 6/1955 | Fannin | 296/165 X |
| 2,843,418 | 7/1958 | Gray | 296/173 |
| 3,160,435 | 12/1964 | Smith | 296/176 |
| 3,286,414 | 11/1966 | Harrison et al. | 296/165 X |
| 3,288,520 | 11/1966 | Krutzikowsky | 296/170 |
| 3,289,684 | 12/1966 | Lowe | 296/159 X |
| 3,377,100 | 4/1968 | Cripe | 296/176 |
| 3,397,007 | 8/1968 | Scheid | 296/27 |
| 3,489,452 | 1/1970 | Plante | 296/161 |
| 3,575,460 | 4/1971 | Kennedy | 296/160 |
| 3,770,314 | 11/1973 | Borskey | 296/176 |
| 3,924,889 | 12/1975 | Gogush | 296/176 |
| 4,027,912 | 6/1977 | Pacca | 296/27 X |
| 4,103,958 | 8/1978 | Parent | 296/165 |
| 4,133,571 | 1/1979 | Fillios | 296/165 |
| 4,201,413 | 5/1980 | Rowe | 296/165 |
| 4,252,136 | 2/1981 | Kruczynski | 135/109 |
| 4,362,258 | 12/1982 | French | 296/160 X |
| 4,362,329 | 12/1982 | Laube et al. | 296/26 |
| 4,366,979 | 1/1983 | Pillot | 296/160 |
| 4,630,627 | 12/1986 | Window et al. | 135/109 X |

FOREIGN PATENT DOCUMENTS

| | | | |
|---|---|---|---|
| 979946 | 12/1975 | Canada | 296/26 |
| 2352105 | 4/1974 | Fed. Rep. of Germany | 296/26 |
| 996245 | 2/1983 | U.S.S.R. | 104/176 |
| 1411885 | 10/1975 | United Kingdom | 296/165 |
| 1567897 | 5/1980 | United Kingdom | 296/26 |

Primary Examiner—Dennis H. Pedder
Assistant Examiner—Andrew C. Pike
Attorney, Agent, or Firm—Pettis & McDonald

[57] ABSTRACT

A hydraulic lifting system for use in raising and lowering a movable top, sized and located to cover an opening in a primary roof structure, includes a support structure attached to opposing longitudinal sides of the roof opening, a plurality of lifting linkages that are slidably attached to the support structure such that at least one pair of linkage is attached to opposing support structures, each lifting linkage is also pivotally attached to the movable top. In addition, a plurality of hydraulic push/pull devices are mounted on the support structure one each interposed between each pair of lifting linkage, so that each lifting linkage may be attached to the adjacent hydraulic push/pull device by a shaft projecting therefrom. Actuation of the hydraulic push/pull device urges the shafts to move in a push/pull relationship with the lifting linkages raising and lowering the top.

10 Claims, 4 Drawing Sheets

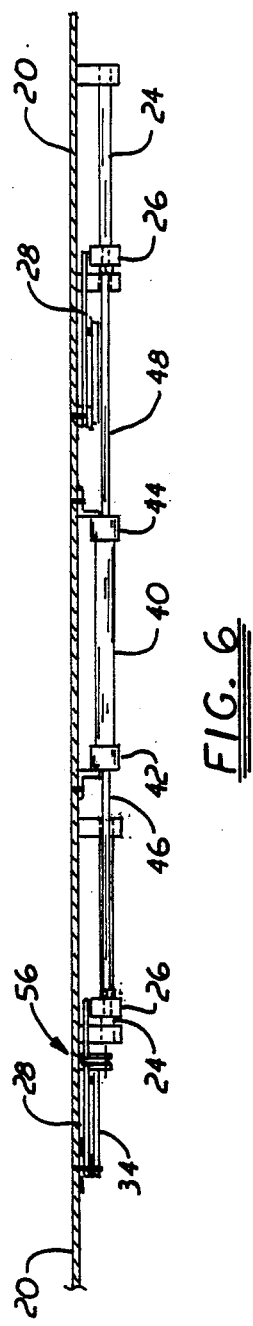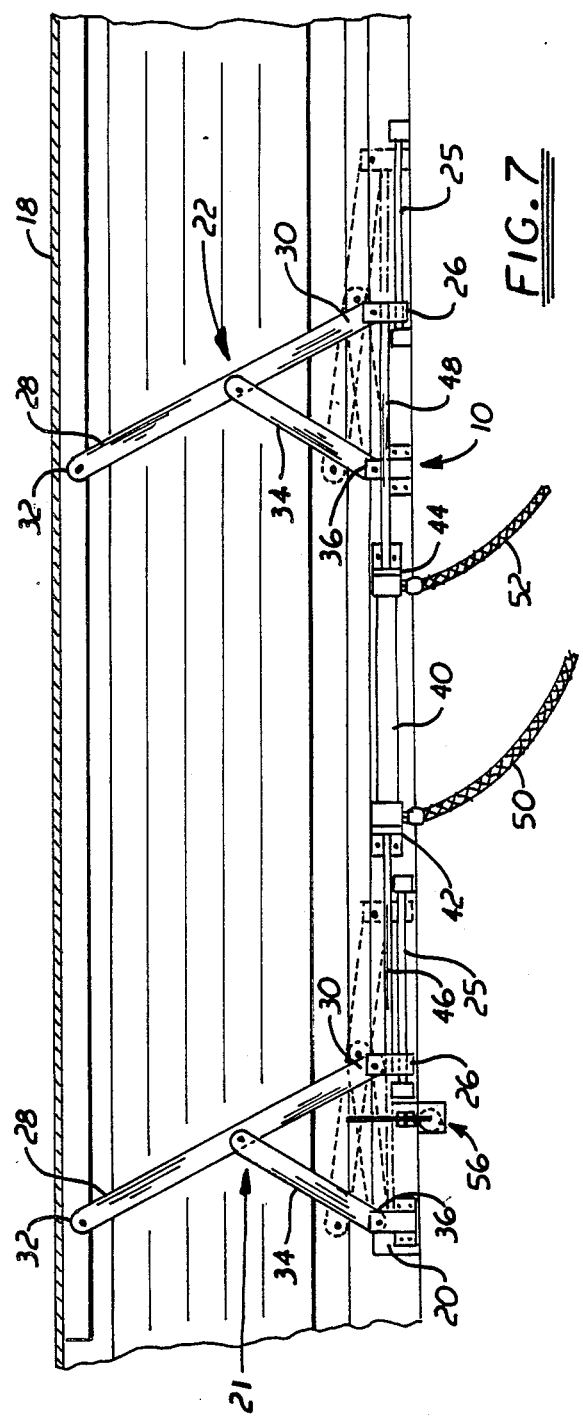

HYDRAULIC LIFT CAMPER TOP

BACKGROUND OF THE INVENTION

1. Field of the Invention.

The present invention relates to a hydraulic lifting system for raising and lowering a movable top that covers a hole through a primary roof structure. In this case, the primary roof structure relates to a van used for camping purposes; however, the same system may be used with camping trailers, buses or any other structure in which it may be desirable to increase the head room.

2. Description of the Prior Art.

It is a well known practice to design recreational vehicles, campers, travel and camper-type trailers and car top mounted sleeping quarters as small and as compact as possible, to provide reduced wind resistance, lower the center of gravity and increase visibility so they may be more easily and safely driven or towed on the road. Then, of course, it is necessary to provide a means for expanding the structures to provide adequate room. It is very desirable to obtain increased head room so that most people may move about the living areas in a fully erect posture. For example, the use of kitchen, living areas and toilet facilities is much more comfortable with adequate head room.

One such device is disclosed in U.S. Pat. No. 3,286,414, issued to C. J. Harrison, et al. This patent teaches a camper body in which the camper top is raised by hydraulic or screw jacks located at the four corners of the camper body. The jacks are attached directly to the moveable roof without the use of a linkage system. No system is disclosed for operating the hydraulic or screw jacks.

U.S. Pat. No. 3,489,452 to V. Plante discloses a camper trailer which utilizes one set of hydraulic cylinders and attached linkages to raise the camper's tent like structure and another set to collapse it. In FIG. 9, the patent discloses the use of a double acting hydraulic cylinder and a lazy tong linkage system as an alternate means for opening and closing the camper.

U.S. Pat. No. 4,366,979 to B. Pillot discloses an expandable roof top camper that utilizes articulated arms located at each of the four corners of the camper. The articulated arms are pushed into an open position by jacks operated by either a spring, air pressure or hydraulic fluid. The hydraulic jack is a single acting self-contained system with no separate hydraulic system disclosed.

U.S. Pat. No. 3,575,460, issued to W. Kennedy discloses a portable sleeping mechanism mounted to the roof of a vehicle which is raised or lowered by a linkage system. The linkage system provides simultaneous lateral and vertical movement and may be operated by a double acting hydraulic piston.

U.S. Pat. No. 4,103,958, issued to J. Parent discloses a camping vehicle, in particular a bus body having a roof detachable from the main body of the bus structure. The roof is raised by hydraulic cylinders to provide a second floor sleeping area. The roof is elevated by hydraulic cylinders. Pairs of these cylinders are joined together by an intercoupling system to provide a concerted action between the coupled cylinders.

The jack systems utilized by Harrison and Parent are inefficient as a means for lifting a roof section as opposed to an entire roof, since the jacks would intrude into and restrict the useable living space. Articulated arms as disclosed by Pillot are not compact and will also be intrusive as they do not fold completely flat. The lever system of Kennedy provides simultaneous vertical and lateral movement; lateral movement is detrimental when raising a roof section where it is much more efficient to lift in a vertical direction only. The more lateral movement permitted the more wasted space that will result.

The current invention provides an efficient means for raising and lowering an expandable top that covers a hole constructed through the hardtops of vans, recreational vehicles, campers, camper trailers or other similar vehicles. The current invention uses a push/pull system operated by double ended, double acting hydraulic cylinders that, in conjunction with a compact scissor lifting mechanism, eliminates bulky and intrusive jack and lever systems, provides a simple intercoupling system for pairs of lifting mechanisms and provides an almost vertical lifting action. In addition, the invention provides a locking mechanism to ensure safety by positively retaining the expandable top in its lowered position.

SUMMARY OF THE INVENTION

The present invention provides a hydraulic lifting system for raising and lowering a movable top that covers an opening in a primary roof structure. The most common use for the invention is in relation to the roof structures of camping type vehicles. The preferred embodiment is demonstrated in relation to a camper van; however, it is obvious that the invention may be applied to any roof structure in which it is desirable to raise or lower that roof structure or a portion thereof. By raising the roof, the floor to ceiling height or head room, is increased permitting the occupants within the camper to move about in an upright posture.

Most simply stated, the hydraulic lifting system provides the needed force and structure for raising and lowering a movable top that covers a hole in an existing vehicle roof. Support members are mounted on the longitudinal edges of the opening to provide a base to which the hydraulic lifting system may be attached. The preferred embodiment discloses two pairs of lifting means, each pair mounted to the support means on opposing longitudinal sides of the roof opening. The lifting means is also attached to the movable top. A double ended and double acting hydraulic cylinder is interposed between each pair of lifting means so that the extendable piston rods projecting from each end can be connected to the adjacent lifting means. When the hydraulic fluid enters at one end of the hydraulic cylinder, it causes the pistons of the hydraulic cylinders to apply a pushing force on one of the lifting means and a pulling force on the other. When the hydraulic fluid enters at the opposite end of the hydraulic cylinder, it causes the pistons of the hydraulic cylinder to move in the opposite direction, applying a pulling force where before there had been a pushing force and a pushing force where there before had been a pulling force. This push/pull force applied to the lifting means causes the lifting means to raise and lower the movable top by a scissor type action.

A hydraulic pump actuated by electrical controls provides the required flow of hydraulic fluid to the hydraulic cylinders. The electrical current may be provided by a battery or other means. A control system comprising an electrical circuit controlled by a three way switch is used to operate a hydraulic valve which determines which end of the hydraulic cylinders the hydraulic fluid will enter.

For safety, to prevent the top from opening during travel or at other times when it is undesirable for it to do so, a latching means has been provided adjacent to one or more lifting means. The latching means is activated by an electrical circuit that operates a solenoid that applies a pulling force to a finger latch causing the latch to engage and thus restrain the lifting means.

An enclosing means is used to maintain the contiguous exterior surface of the van when the top is raised from its closed position to its open position. The enclosing means may be constructed of flexible material and formed in an accordion style pleat so that it stores neatly away when the movable top is in the closed position. The enclosing means completely encircles the movable top, and is thus attached proximal to the outer edge of the movable top and proximal to the edge of the opening through the camper van.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with accompanying drawings, in which:

FIG. 6 is a detailed top view of the hydraulic lifting system.

FIG. 7 is a detailed side view of the hydraulic lifting system.

Similar reference characters refer to similar parts throughout the several views of the drawings.

DETAILED DESCRIPTION

A preferred embodiment for the hydraulic lifting system is illustrated in drawing FIGS. 1-7, with the hydraulic lifting system generally shown as 10.

Figure 1:
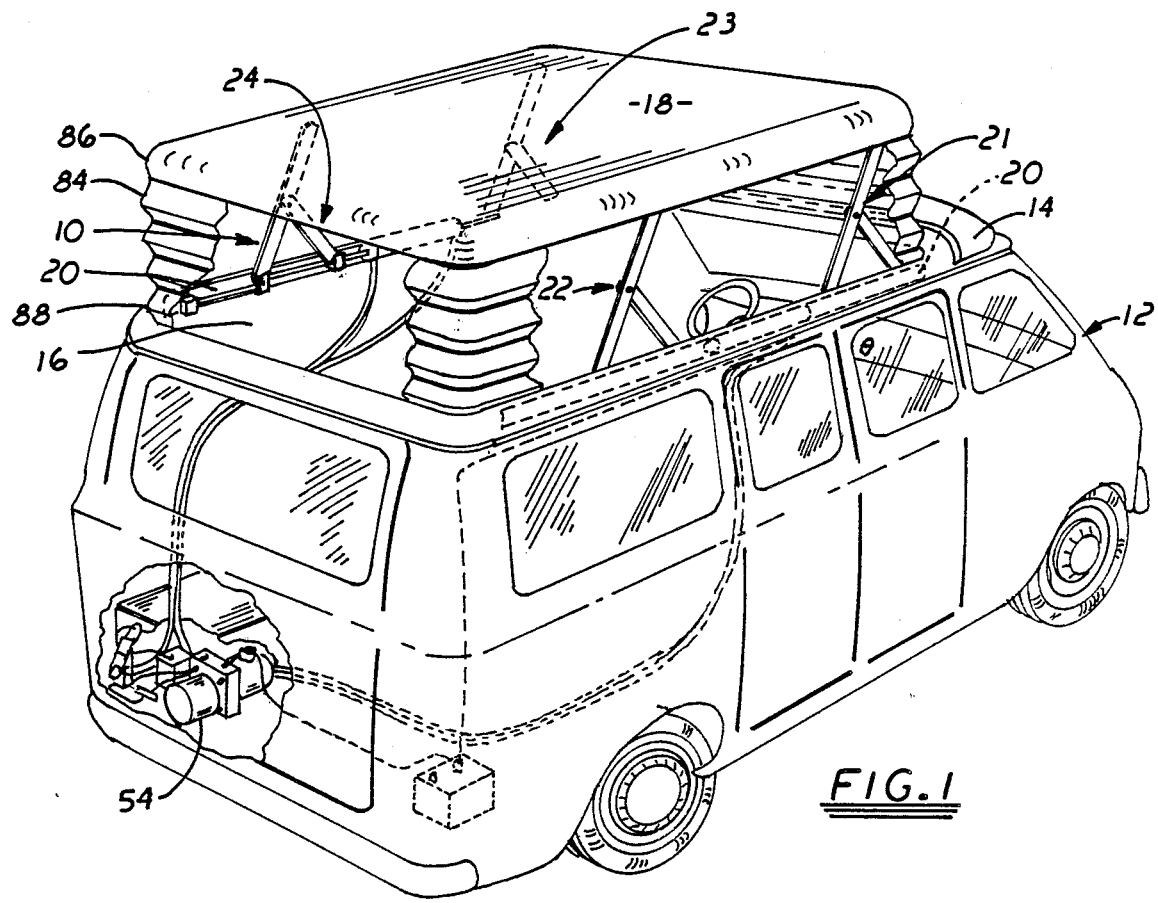
FIG. 1 is a perspective view of a preferred embodiment of the hydraulic lifting system for a moveable top for a van.

FIG. 1 illustrates the relationship of the hydraulic lifting system 10 with a typical camping van shown generally as 12. A major portion of the van roof 14 has been removed leaving a hole 16 therethrough. A movable top 18 has been mounted on the hydraulic lifting system 10 so that the movable top 18 may be lowered to cover the hole 16 and raised to provide greater head room within the van 12. One support means 20 is mounted on each of the opposing longitudinal sides of the roof opening 16.

Figure 3:
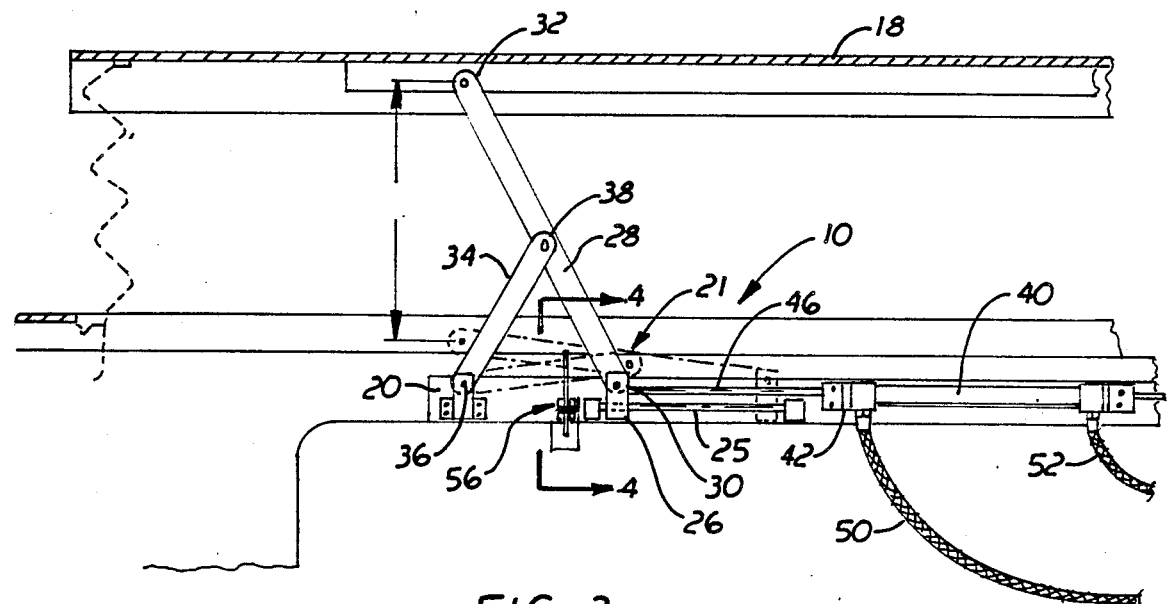
FIG. 3 is a sectional view of the lifting means taken along line 3—3 of FIG. 2.

As shown in FIG. 3, a lifting means shown generally as 21 is mounted to the support means 20. The lifting means 21 is comprised of a guide rod 25 mounted longitudinally to the support means 20, a bracket 26 slidably mounted on the guide rod 25, an actuating strut 28 having a first end 30 and a second end 32. The first end 30 of the actuating strut 28 is pivotally attached to the bracket 26 and the second end 32 is pivotally attached to the movable top 18. A support strut 34 has a first end 36 that is pivotally attached to the support means 20 and a second end 38 that is pivotally attached to the actuating strut 28 intermediate the first end 30 and the second end 32. While this describes the preferred embodiment, it can easily be seen that the linkage of each lifting means may be reversed. In addition, other similar variations may be made.

A double acting and double ended hydraulic cylinder 40 is mounted longitudinal to the support means 20 and longitudinally interposed between a first lifting means 21 and a second lifting means 22, as best seen in FIG. 7. A first piston rod 46 is extendable from the first longitudinal end 42 of the hydraulic cylinder 40 and a second piston rod 48 is extendable from the second longitudinal end 44 of the hydraulic cylinder 40. The first piston rod 46 is connected to the bracket 26 of the first lifting means 21. The second piston rod 48 is connected to the bracket 26 of the second lifting means 22. The pistons 46 and 48 of the hydraulic cylinder 40 are interconnected to operate in a push/pull relationship. When hydraulic fluid flows through the first hydraulic hose 50 and into the hydraulic cylinder 40, the fluid causes the first piston rod 46 to retract into the hydraulic cylinder 40 and the fluid causes the second piston rod 48 to extend from the hydraulic cylinder 40. Retraction of the first piston rod 46 causes the bracket 26 of the first lifting means 21 to slidably move along the guide rod 25 toward the hydraulic cylinder 40. As the bracket 26 moves toward the hydraulic cylinder 40, the second end 32 of the actuating strut 28 moves in a downward direction. At the same time, piston rod 48 is extended and it slidably pushes bracket 26 of the second lifting means 22 along the guide rod 25 away from the hydraulic cylinder 40 causing the second end 32 of the actuating strut 28 to move in a downward direction in a similar fashion and in conjunction with the actuating strut 28 of the first lifting means 21. This causes the movable top 18 to move downward toward the van roof 14 placing it in a closed position. When the hydraulic fluid flows into the hydraulic cylinder 40 through hose 52, the hydraulic fluid causes the first piston rod 46 to extend from the cylinder 40 and the second piston rod 48 to withdraw into the cylinder 40. This causes the second ends 32 of both lifting means 21 and 22 to rise, lifting the movable top 18 away from the van roof 14.

Figure 4:
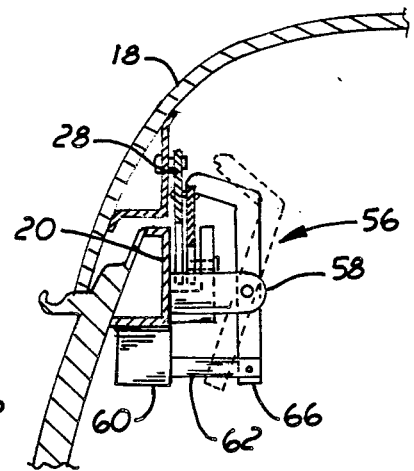
FIG. 4 is a sectional view of the latching means taken along line 4—4 of FIG. 3.

FIGS. 3, 6 and 7 provide general reviews of the latching mechanism, shown generally as 56, illustrating its relationship with lifting means 21, and FIG. 4 is a detail of the latching means 56. The latching means 56 comprises a finger latch 64, a latch bracket 58, a solenoid 60 and a solenoid shaft 62. The finger latch 64, having a first end 66 and a second end 68, is pivotally mounted to the latch bracket 58 intermediate the first end 66 an the second end 68 of the finger latch 64. The latch bracket 58 is fixedly mounted to the support means 20 proximal to the first lifting means 21, so that the second end 68 of the finger latch 64 may releasably engage the support strut 34 of the first lifting means 21. A solenoid 60 is mounted upon the support means 20 proximal to the latch bracket 58 so that the solenoid shaft 62 can be pivotally attached to the first end 66 of the finger latch 64. Under the stimulus of an appropriate electrical current the solenoid shaft 62 extends, pushing the finger latch 64. The finger latch then pivots about the latch bracket 58 causing the second end 68 of the finger latch 64 to engage the support strut 34 to lock the movable top 18 in a closed or downward position. This is the preferred embodiment; however the latching means may be so sized and so located to engage strut 28.

The foregoing description has related primarily to lifting means 21 and 22 and their related equipment as shown in FIG. 7. It is to be remembered that lifting means 23 and 24 are mounted to a support means 20 on the opposite side of the roof opening 16. This equipment is a mirror image of the structure shown in FIG. 7 and operates basically in the same manner.

Figure 2:
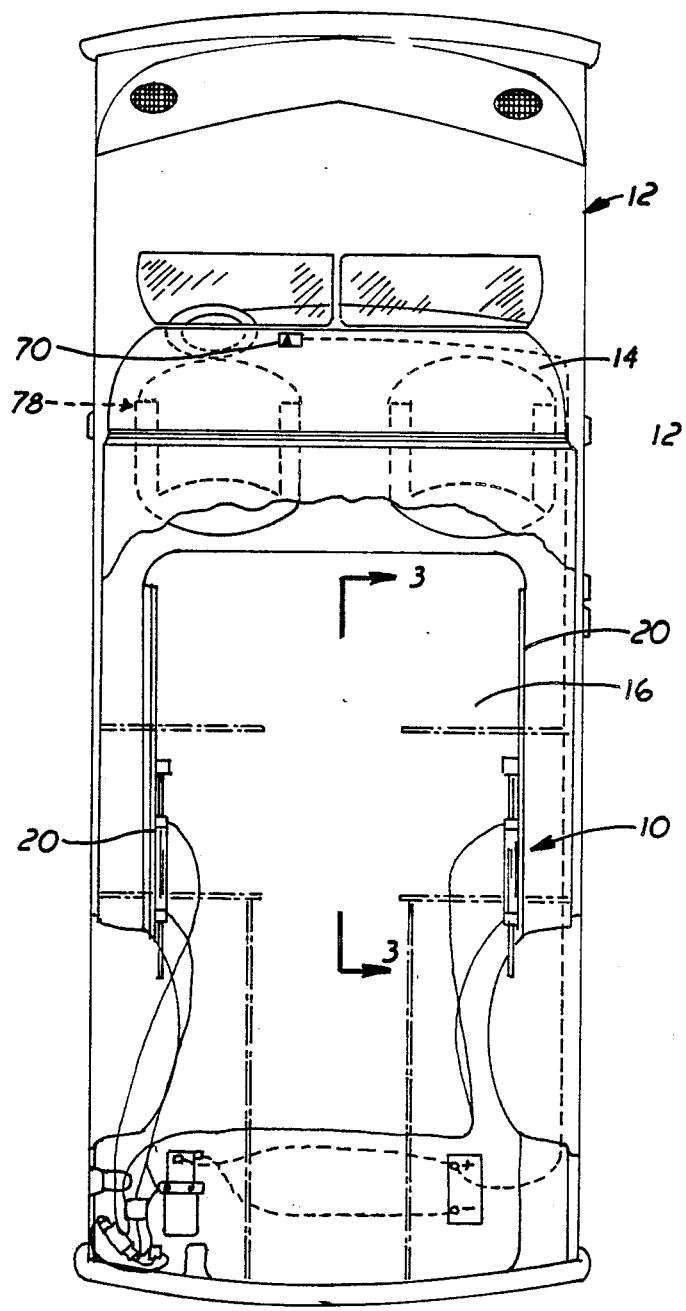
FIG. 2 is a top view of the van with the movable top removed and the interior structure shown in phantom.
Figure 5:
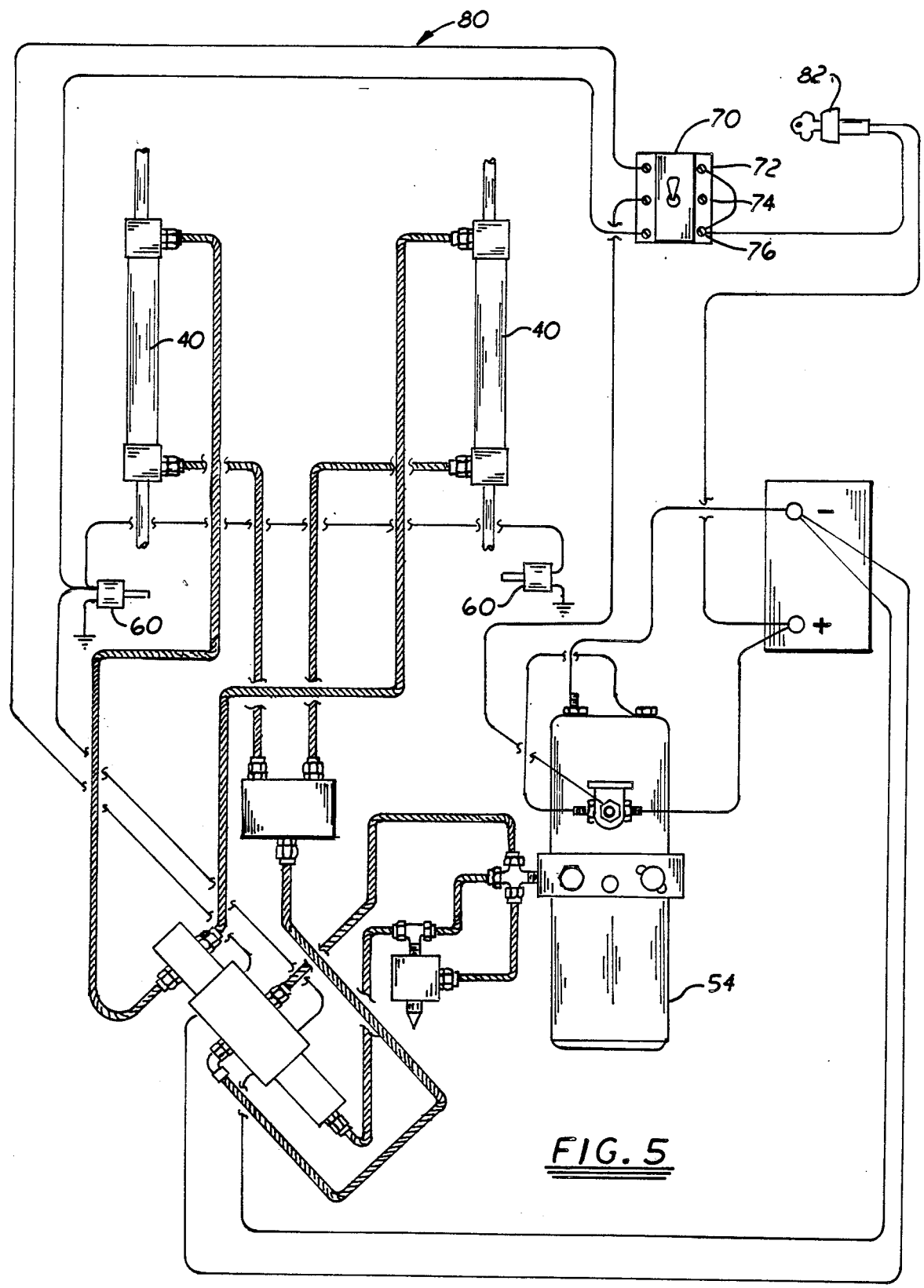
FIG. 5 is a schematic drawing of the hydraulic and electrical systems for operation of the hydraulic lift.

FIG. 5 is a schematic illustration of the electrical and the hydraulic systems required to operate the hydraulic lifting system. On the schematic, an electrical switch 70 can be seen to have three positions: an up position 72, a neutral or off position 74, and a down position 76. In FIG. 2, it can be seen that the switch 70 is located near the driver's position 78 for ease of operation. In the schematic view of FIG. 5, it can be seen that the electrical circuit shown generally as 80 passes through the ignition switch 82 of the van 12. This prevents the hydraulic lifting system 10 from operating without the ignition switch 82 being in the on position. The schematic of FIG. 5 shows two solenoids 60 that in the preferred embodiment are necessary for the operation of two latching means 56. A latching means 56 is located with each pair of lifting means 21-22 and 23-24. Also depicted within the schematic of FIG. 5 are the hydraulic motor 54 and the two hydraulic cylinders 40.

An enclosing means 84, shown in FIG. 1, may be constructed of flexible material and formed in an accordion style pleat so that it stores neatly away when the movable top 18 is in the closed position. In FIG. 1, the enclosing means 84 has been broken out so that one may see inside the van; however, the enclosing means 84 completely encircles the movable top 18. The upper edge 86 of the enclosing means 84 is attached to the movable top 18, and the lower edge 88 is attached to the edge of the roof 14 adjacent to the hole 16. The enclosing means 84, by being contiguously attached to both the moveable top 18 and the edge of the roof structure 14, maintains the continuous exterior surface between the moveable top 18 and the roof structure 14 when the moveable top 18 is raised.

Having thus set forth a preferred construction for the hydraulic lifting system 10, it is to be remembered that this is but a preferred embodiment. Attention is now invited to a description of the use of the hydraulic system 10. To operate the hydraulic system 10, with the movable top 18 in the down position the operator must turn on the ignition switch 82 of the van 12 and then push the electrical switch 70 into the up position 72. As soon as the switch 70 is placed in the up position 72, an electrical current flows through the solenoids 60 causing the solenoid shafts 62 to be withdrawn into the solenoids 60 releasing the second end 68 of the finger latch 64 from engagement with the actuating strut 28 and the support strut 34 of the lifting means 21. This immediately frees lifting means 21 and 23 so that the top 18 may be raised into the up position. With the switch 70 in the up position 72, the hydraulic pump is engaged forcing hydraulic fluid through hose 52 of the hydraulic cylinder 40 causing the second piston rod 48 to be withdrawn into the cylinder pulling the attached bracket 26 along the related guide rod 25 toward the hydraulic cylinder 40, which results in the second end 32 of the actuating strut 28 of lifting means 22 being lifted upward urging the movable top 18 upward. As the fluid passes through hose 52 and into the hydraulic cylinder 40, it also extends the first piston rod 46 outwardly from the hydraulic cylinder 40. The movable top 18 is then lifted in the same manner as accomplished by lifting means 22 except that in this case, the actuating strut 28 of the first lifting means 21 is pushed instead of pulled. The second pair of lifting means 23 and 24 are simultaneously operated in the same fashion.

When the movable top 18 is in the fully upright position extending the enclosing means 84, the switch 70 is moved into the neutral or off position 74.

To close the movable roof 18, the system basically operates in reverse. The switch 70 is moved into the down position 76 after the ignition switch 82 is turned to the on position which operates the hydraulic pump 54. A delay within the electrical circuit prevents the operation of the solenoids 60 until the movable top 18 reaches the closed position. With the switch 70 in the down position 76 the hydraulic fluid is forced through hose 50 and into the hydraulic cylinder 40 causing the second piston rod 48 to extend from the hydraulic cylinder 40 and to push bracket 26 of the second lifting means 22 away from the hydraulic cylinder 40 along the guide rod 25. As the bracket 26 moves along the guide rod 25, the second end 32 of the actuating strut 28 moves in a downward direction urging the movable top 18 downward. At the same time that the second piston rod 48 is pushed out from the hydraulic cylinder 40, the first piston rod 46 is withdrawn into the hydraulic cylinder 40. As the piston rod 46 withdraws into the hydraulic cylinder 40, the piston rod 46 pulls the bracket 26 along the guide rod 25 toward the hydraulic cylinder 40, causing the second end 32 of the actuating strut 28 to move in a downward direction. After the movable top 18 reaches the closed position, the hydraulic pump is shut down and an appropriate electrical current is permitted to pass through the solenoids 60 causing the solenoid shafts 62 to extend rotating the finger latch 64 about the latch brackets 58. The finger latch 64 then is moved into the closed or locked position engaging support strut 34. As the movable roof 18 is lowered into the closed position, the enclosing means 84 is folded and stored out of the way. When the latching means is in the locked position, the switch 70 is moved into the neutral or off position 74.

Having set forth the description of the operation of the hydraulic lifting system, it will thus be seen that the objects set forth above, among those made apparent from the preceding description, are efficiently attained, and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

We claim:

1. A hydraulic lifting system for raising and lowering a movable top, sized and located to cover an opening in a primary roof structure, said opening having at least two opposing sides, said system comprising:

a plurality of support means, at least one of said support means mounted on each of said opposing sides of said roof opening;

a plurality of lifting means, at least one pair of said lifting means mounted on said support means in each of said opposing sides of said roof opening, each of said lifting means comprising a guide rod mounted on and longitudinal to said support means; a bracket slidably mounted on said guide rod; an actuating strut, having a first and a second end, said first end of said actuating strut pivotally attached to said bracket, said second end of said actuating strut pivotally attached to said movable top; a support strut, having a first and a second end, said first end of said support strut pivotally attached to said support means and said second end of said support strut pivotally attached to said actuating strut intermediate said first and second ends to said actuating strut;

a plurality of hydraulic push-pull means, one of said push-pull means mounted on said support means on each of said opposing sides of said roof opening, said hydraulic push-pull means mounted longitudinal to said support means and interposed between each said lifting means of said pair of said lifting means, said push-pull means having a first and a second longitudinal end, and having a first shaft extendable from said first longitudinal end, and a second shaft extendable from said second longitudinal end, said first shaft connected to said bracket of one of said pair of lifting means and said second shaft connected to said bracket of the other of said pair of lifting means, whereby actuation of said hydraulic push-pull means causes said first and second shafts to move in a push-pull relationship with each other to actuate said lifting means to raise and lower said moveable top; and a hydraulic fluid pressure means operatively connected to said hydraulic push-pull means.

2. A hydraulic lifting system as in claim 1 wherein said hydraulic push-pull means comprises a double ended and double acting hydraulic cylinder 3. A hydraulic lifting system as in claim 1 further comprising at least one latching means attached to said support means and removably engaging said lifting means.

4. A hydraulic lifting system as in claim 3 wherein said latching means comprises a latch bracket fixedly fastened to said support means, said latch bracket located proximal to at least one of said support struts and said actuating struts of said lifting means when said support and said actuating struts are lowered; a solenoid affixed to said support means proximal to said latch bracket, said solenoid having an extendable shaft, said solenoid shaft having an extended position and a retracted position; a finger latch having a first and second end, said finger latch being pivotally attached to said latch bracket intermediate said first and second ends of said finger latch, said first end of said finger latch being pivotally attached to said solenoid shaft, whereby actuation of said solenoid to said extended position causes said finger latch to pivot about said latch bracket and engage at least one of said support struts and said actuating struts of said lifting means, and actuation of said solenoid to said retracted position causes said finger latch to pivot about said latch bracket and disengage said lifting means.

5. A hydraulic lifting system as in claim 1 further comprising an enclosing means formed from flexible material and interconnecting said movable top and said roof structure proximal to said roof opening, whereby said enclosing means maintains a continuous exterior surface between said moveable top and said roof structure when said movable top is raised.

6. A hydraulic lifting system for raising and lowering a movable top, sized and located to cover an opening in a primary roof structure, said opening having at least two opposing sides, said system comprising:

a plurality of support means, at least one of said support means mounted on each of said opposing sides of said roof structure opening;

a plurality of lifting means, at least one pair of said lifting means mounted on said support means on each of said opposing sides of said roof opening;

a plurality of hydraulic push-pull means, one of said push-pull means mounted on said support means on each of said opposing sides of said roof opening, said hydraulic push-pull means mounted longitudinal to said support means and interposed between each said lifting means of said pair of said lifting means, said push-pull means having a first and a second longitudinal end, and having a first shaft extendable from said first longitudinal end, and a second shaft extendable from said second longitudinal end, said first shaft connected to of one of said pair of lifting means and said second shaft connected to the other of said pair of lifting means, whereby actuation of said hydraulic push-pull means causes said first and second shafts to move in a push-pull relationship with each other to actuate said lifting means to raise and lower said movable top;

at least one latching means comprising a latch bracket fixedly fastened to said support means, said latch bracket located proximal to one of said lifting means; a solenoid affixed to said support means proximal to said latch bracket, said solenoid having an extendable shaft, said solenoid shaft having an extended position and a retracted position; a finger latch having a first and second end, said finger latch being pivotally attached to said latch bracket intermediate said first and second ends of said finger latch, said first end of said finger latch being pivotally attached to said solenoid shaft, such that actuation of said solenoid to said extended position causes said finger latch to pivot about said latch bracket and engage said lifting means, when said top is lowered, and actuation of said solenoid to said retracted position causes said finger latch to pivot about said latch bracket disengaging said lifting means; and a hydraulic fluid pressure means operatively connected to said hydraulic push-pull means.

7. A hydraulic lifting system as in claim 6 wherein each of said lifting means further comprises: a guide rod mounted on and longitudinal to said support means; a bracket slidably mounted on said guide rod; an actuating strut, having a first and a second end, said first end of said actuating strut pivotally attached to said bracket, said second end of said actuating strut pivotally attached to said movable top; a support strut, having a first and a second end, said first end of said support strut pivotally attached to said support means and said second end of said support strut pivotally attached to said actuating strut intermediate said first and second ends of said actuating strut.

8. A hydraulic lifting system as in claim 7 wherein said hydraulic push-pull means comprises a double ended and double acting hydraulic cylinder.

9. A hydraulic lifting system as in claim 6 further comprising an enclosing means formed from flexible material and interconnecting said movable top and said roof structure proximal to said roof structure opening, whereby said enclosing means maintains the continuous exterior surface between said moveable top and said roof structure when said movable top is raised.

10. A hydraulic lifting system for raising and lowering a movable top, sized and located to cover an opening in a primary roof structure, said opening having two pairs of opposing sides, said system comprising:

a plurality of support means, at least one of said support means mounted on at least one of said opposing sides of said roof opening;

a plurality of lifting means, at least one pair of said lifting means mounted on said support means in each of said opposing sides of said roof opening, each of said lifting means comprising a guide rod mounted on and longitudinal to said support means; a bracket slidably mounted on said guide rod; an actuating strut, having a first and a second end, said first end of said actuating strut pivotally attached to said bracket, said second end of said actuating strut pivotally attached to said movable top; a support strut, having a first and a second end, said first end of said support strut pivotally attached to said support means and said second end of said support strut pivotally attached to said actuating strut intermediate said first and second ends of said actuating strut;

a plurality of hydraulic push-pull means, comprising double ended and double acting hydraulic cylinder, one of said hydraulic cylinders mounted on said support means on each side of one of said pairs of opposing sides of said roof opening, said hydraulic push-pull means mounted longitudinal to said support means and interposed between each said lifting means of said pair of said lifting means, said hydraulic cylinder having a first and a second longitudinal end, and having a first piston rod and a second piston rod extendable from said corresponding first and second longitudinal ends, said first piston rod connected to said bracket of one of said pair of lifting means and said second piston rod connected to said bracket of the other of said pair of lifting means, whereby actuation of said hydraulic cylinder causes said first and said second piston rods to move in a push-pull relationship with one another, to actuate said lifting means to selectively raise and lower said movable top;

at least one latching means comprising a latch bracket fixedly fastened to said support means, said latch bracket located proximal to at least one of said support struts and said actuating struts of said lifting means when said support and said actuating struts are lowered; a solenoid affixed to said support means proximal to said latch bracket, said solenoid having an extendable shaft, said solenoid shaft having an extended position and a retracted position; a finger latch having a first and second end, said finger latch being pivotally attached to said latch bracket intermediate said first and second ends of said finger latch, said first end of said finger latch being pivotally attached to said solenoid shaft, whereby actuation of said solenoid to said extended position causes said finger latch to pivot about said latch bracket and engage at least one of said support struts and said actuating struts of said lifting means, and actuation of said solenoid to said retracted position causes said finger latch to pivot about said latch bracket disengaging said lifting means;

a hydraulic fluid pressure means operatively connected to said hydraulic push-pull means; and an enclosing means formed from flexible material and interconnecting said movable top and said roof structure proximal to said roof structure opening, whereby said enclosing means maintains a continuous exterior surface between said movable top and said roof structure when said movable top is raised.

* * * * *

UNITED STATES PATENT AND TRADEMARK OFFICE
CERTIFICATE OF CORRECTION

PATENT NO. : 4,981,319
DATED : Jan. 1, 1991
INVENTOR(S) : Gerzeny, et al.

It is certified that error appears in the above-identified patent and that said Letters Patent is hereby corrected as shown below:

In the Claims:

Claim 1, column 7, line 5, "in" should be "on";
      column 7, line 19, "to" should be "of".
Claim 2, column 7, line 43, a period should be added to the end of that sentence.

Claim 10, column 9, line 21, "in" should be "on".
Claim 10, column 9, lines 37-38, "cylinder" should be "cylinders".

Signed and Sealed this

Twenty-second Day of September, 1992

Attest:

DOUGLAS B. COMER

Attesting Officer      Acting Commissioner of Patents and Trademarks